(12) United States Patent
Quinn

(10) Patent No.: US 8,128,321 B2
(45) Date of Patent: Mar. 6, 2012

(54) DRILLING TEMPLATES

(76) Inventor: Peter Quinn, Dorset (GB)

( * ) Notice: Subject to any disclaimer, the term of this patent is extended or adjusted under 35 U.S.C. 154(b) by 569 days.

(21) Appl. No.: 12/224,251

(22) PCT Filed: Jan. 24, 2007

(86) PCT No.: PCT/GB2007/000222
§ 371 (c)(1),
(2), (4) Date: Jun. 15, 2009

(87) PCT Pub. No.: WO2007/085812
PCT Pub. Date: Aug. 2, 2007

(65) Prior Publication Data
US 2009/0274527 A1      Nov. 5, 2009

(30) Foreign Application Priority Data
Jan. 24, 2006   (GB) .................................. 0601420.3

(51) Int. Cl.
*B23B 47/28*   (2006.01)
(52) U.S. Cl. .................................................. 408/115 R
(58) Field of Classification Search .................... 408/97, 408/103, 115 R, 115 B; *B23B 47/28*
See application file for complete search history.

(56) References Cited

U.S. PATENT DOCUMENTS

| | | | | |
|---|---|---|---|---|
| 1,097,153 A | * | 5/1914 | Wolgamood | 408/115 R |
| 2,166,692 A | * | 7/1939 | Ray | 408/115 R |
| 2,341,107 A | * | 2/1944 | MacDonald | 408/115 R |
| 4,194,861 A | * | 3/1980 | Keller | 408/109 |
| 6,468,007 B2 | * | 10/2002 | Coleiro | 408/115 R |
| 2009/0191015 A1 | * | 7/2009 | Quinn | 408/115 R |

FOREIGN PATENT DOCUMENTS

| | | | |
|---|---|---|---|
| DE | 3039673 A | * | 5/1982 |
| DE | 3221155 A | * | 12/1983 |
| DE | 4410600 A1 | * | 11/1994 |
| EP | 93391 A2 | * | 11/1983 |
| WO | WO 8911935 A1 | * | 12/1989 |
| WO | WO 9713608 A1 | * | 4/1997 |
| WO | WO 2005023470 A2 | * | 3/2005 |

* cited by examiner

*Primary Examiner* — Daniel Howell
(74) *Attorney, Agent, or Firm* — J. Wiley Horton

(57) ABSTRACT

A drilling template for use in jointing workpieces, the template consisting of a substantially rectilinear bar with through holes through which holes can be drilled in the workpieces to effect said jointing, a locating device for locating the template relative to the workpieces when the though holes are being drilled, and spacers for spacing the locating device from the bar to enable the position of the through holes to be adjusted relative to the workpiece.

8 Claims, 3 Drawing Sheets

DRILLING TEMPLATES

This application is a U.S. National Stage application filed pursuant to 35 U.S.C. §371. Pursuant to the cited section and the Patent Cooperation Treaty, priority is claimed to International Application No. PCT/GB07/000222 having a priority date of Jan. 24, 2007.

This invention concerns drilling templates or jigs, particularly for drilling holes in the ends and edges of wood and wood based workpieces.

The drilling of holes in the ends and edges of wood and wood based workpieces is widely used in the construction of furniture from wood and wood based sheets. Typically such joints are formed by drilling holes into an end of one sheet and also into a surface of another sheet, dowels being inserted into the respective holes to locate one sheet relative to the other. As is well known, the accuracy of the resulting joints depends on the accuracy with which the respective holes are drilled into the respective sheets. More particularly, the holes in the ends of the sheets need to be accurately positioned relative to one surface of sheet, and the holes in the surfaces of the sheets need to be accurately positioned relative to the ends of the sheets.

Drilling templates for producing such joints have been proposed hitherto.

An example of one such template consists of a L-section block which is clamped to a workpiece, holes in the workpiece being drilled through holes in the block. These templates suffer from a number of disadvantages, notably the inability to change the position of the resultant holes relative to the thickness of a workpiece and the difficulty in accurately positioning the templates relative to the workpieces. A range of different sizes of template could be used to overcome the former of these disadvantages. However, the manufacturers of such templates tend to produce ranges of templates for substantially different thicknesses of workpiece which also have different diameter through holes. Furthermore, the restricted number of through holes through such templates make it difficult to position the templates accurately relative to edges of the workpieces, and hence make accurate registration of dowel holes to be achieved between workpieces which are to be jointed.

According to the present invention there is provided a drilling template for use in jointing workpieces, the template comprising a substantially rectilinear bar with through holes through which holes can be drilled in the workpieces to effect said jointing, locator means for locating the template relative to the workpieces when said though holes are being drilled, and spacer means for spacing the locator means from the bar to enable the position of the through holes to be adjusted relative to a surface of the workpiece being drilled.

Embodiments of drilling template in accordance with the present invention will now be described with reference to the accompanying drawings in which:—

Figure 1:
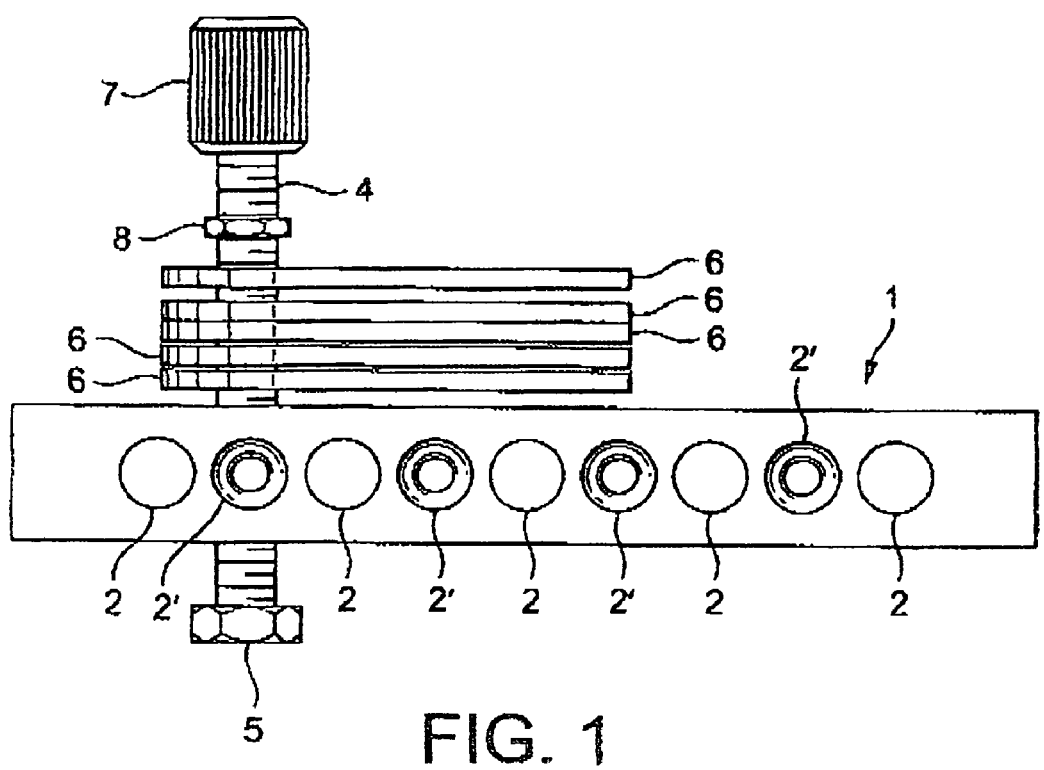
FIG. 1 is a side view of a first embodiment.
Figure 1A:
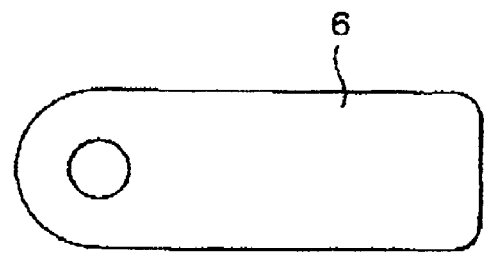
FIG. 1a is a plan view of a part of the embodiment of FIG. 1.
Figure 1B:
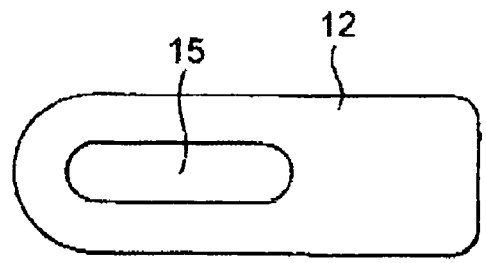
FIG. 1b is a plan view of a part of the embodiment shown in FIG. 2-5.
Figure 2:
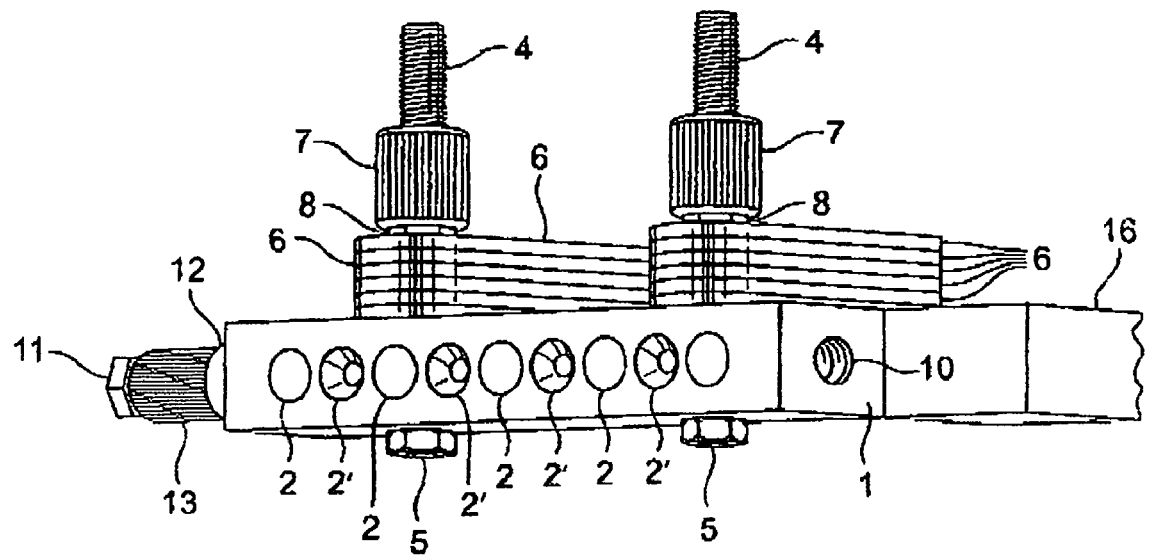
FIG. 2 is a perspective view of the first embodiment positioned on the end of a workpiece.
Figure 3:
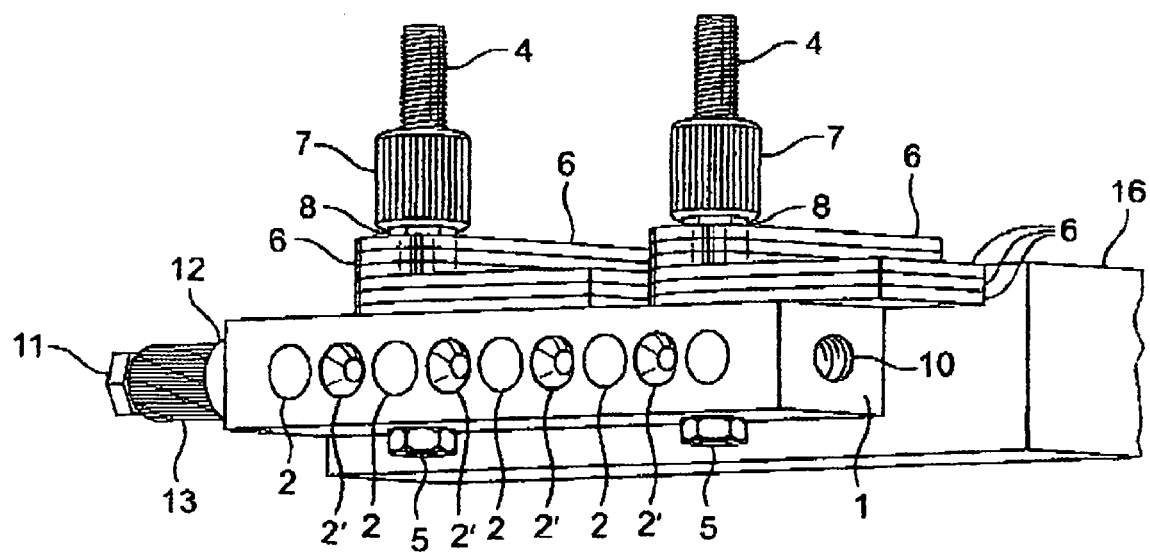
Figure 4:
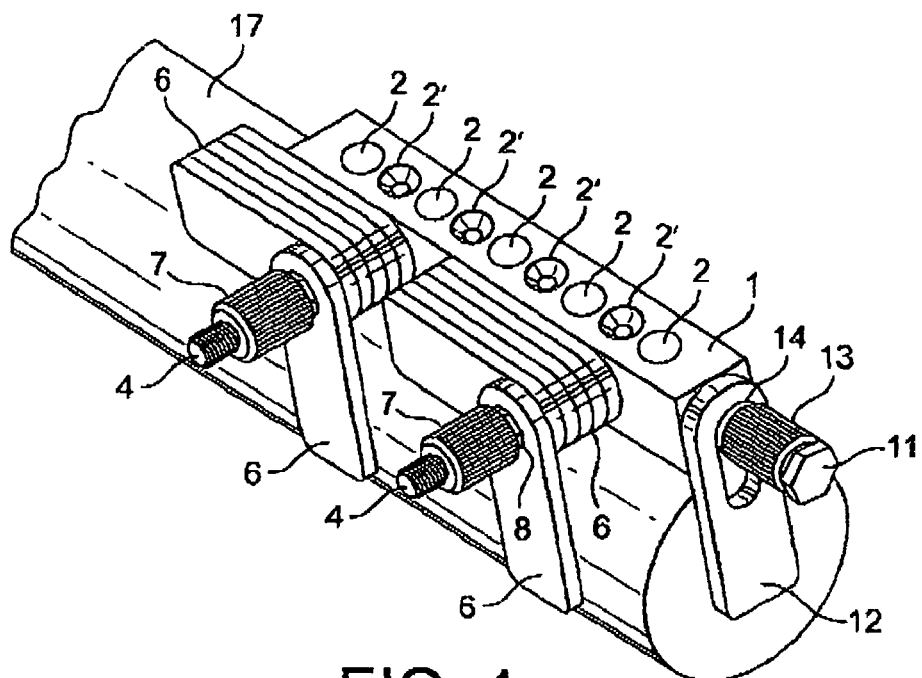
Figure 5:
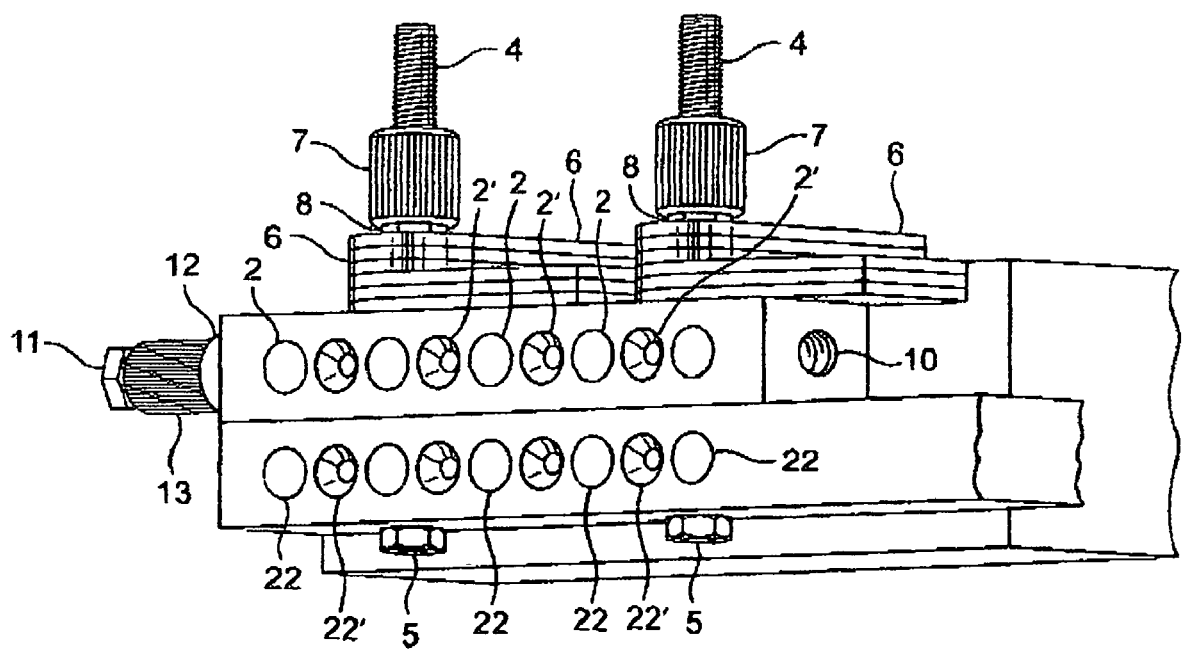

FIG. 3 corresponds to FIG. 2 but with the template positioned on the end of a thicker workpiece;

FIG. 4 corresponds to FIG. 2 but with the template positioned on the end of a workpiece of circular section; and FIG. 5 is a perspective view of a second embodiment.

The template shown in FIGS. 1 to 4 consists of a square section rectilinear bar 1 having a plurality of parallel through holes 2 perpendicular to one surface of the bar 1, alternate holes 2' being countersunk, and a plurality of further through holes 3 passing through the bar 1 perpendicular to surfaces of the bar 1 through which the holes 2 pass.

Bolts 4 (only one being shown in FIG. 1) are located in the holes 3, their heads 5 preventing them from passing through the bar 1. On each of the bolts 4, on the opposite side of the bar 1 from the heads 5, is a plurality of tabs 6 which are pivotal on the bolts 4. Knurled nuts 7 are threaded on to the bolts 4, and spring washers 8 between the nuts 7 and the tabs 6, serve to lock the tabs 6 in position when the nuts 7 are tightened on to the tabs 6.

The bar 1 has threaded holes 10 in each end, a bolt 11 being located in one of the holes 10. A further tab 12 is located on the bolt 11, and a knurled nut 13 and a spring washer 14 can be used to lock the tab 12 on the end of the bar 1. The tab 12 has a slotted hole 15 therein which enables the tab 12 to be slid relative to the bolt 11 in addition to being rotated about the bolt 11.

The holes 2 in the bar 1 are positioned along the center line of the bar 1 and at regular, predetermined distances from each other and from each end of the bar 1. This enables holes to be drilled through the holes 2 at predetermined intervals and at a predetermined distance from the ends of the bar 1.

As shown in FIG. 2, the tabs 6 are all locked in position by the respective bolts 4 and washers 8 so that they extend substantially perpendicularly to the length of the bar 1. The tab 12 is locked in position on the bar 1 using the nut 13, the tab 12 having previously been slid so that it extends as far as possible from the bar 1 and is positioned so that it extends in substantially the same direction as the tabs 6 but perpendicular thereto.

The bar 1 is then located on an end portion of a workpiece 16 with the tabs 6 flat on one face of the workpiece 16 and the tab 12 contacting a side of the workpiece, for example using a G-cramp (not shown) or using screws screwed into the workpiece 16 through countersunk holes 2' in the bar 1.

As shown in FIG. 2, the workpiece 16 is of substantially the same thickness as the bar 1, and so drilling holes in the end of the workpiece 16 through the holes 2 using a drill bit of substantially the diameter of the holes 2 will result in the drilled holes being substantially along the center line of the thickness of the workpiece 16, and at a predetermined distance from one edge of the workpiece 16 governed by the dimensions of the bar 1 and the positions of the holes 2.

The bar 1 can then be used to drill holes in the surface of a further workpiece which is to be jointed to the workpiece 16 by positioning the bar 1 on the surface of an end portion of the further workpiece with the tabs 6 abutting the end of the further workpiece and the tab 12 abutting a side of the further workpiece. Holes drilled through the holes 2 in the further workpiece will then be positioned so that when suitably sized dowels are inserted into them, the two workpieces will form an accurately aligned joint.

FIG. 3, which corresponds to FIG. 2, shows the bar 1 being used to joint thicker workpieces. In order to effect this, the tabs 6 on the bar 1 have been loosened by undoing the nut 4, and then rotating them so that they extend along the length of the bar 1 rather than perpendicular thereto, and the tabs 6 are then locked in their new positioned by the nut 4.

The number of tabs 6 which are rotated will depend on the thickness of the thicker workpiece, the tabs 6 being of particular thicknesses to displace the bar 1 across the end of the thicker workpieces by particular distances to bring the centers of the holes 2 on to the center line of the end of the thicker workpieces. For example, if the bar 1 has a cross section of 16 mm×16 mm, all of the tabs 6 will be positioned perpendicular to the bar 1 if holes are to be drilled along the center line of a workpiece 16 mm thick. However, if holes are to be drilled along the center line of a 18 mm thick workpiece, a single 1 mm thick tab abutting the bar 1 will be rotated to be in line with the bar 1, the center line then being (8+1) mm, that is ½×19 mm from the surface of the workpiece.

The tabs 6 can all be of the same thickness or of a variety of thicknesses according to the desired displacements of the center line of the holes 2 in the bar 1, and they can, if desired, be used in combination to provide a variety of displacements. For example they can be 1, 2, 3 or more mm thick. As will be appreciated, at least one tab 6 will be required to position the bar 1 relative to the workpiece with which it is being used.

The bar 1 can be of rectangular cross section rather than square as shown in the drawings.

Referring to FIG. 4, the template can be seen being used to drill radial holes in around workpiece 17.

The embodiment shown in FIG. 5 is a modification of the embodiment shown in FIGS. 1-4, a second square section bar 20 being attached to the bar 1 by the bolts 4 which pass through holes in both of the bars 1 and 20. The bar 20 also has a plurality of through holes 22 with alternate countersunk through holes 22', the latter being useful for attaching the bar 20 to the workpiece. Once attached to a workpiece, the bar 20 can be used as a datum for repositioning the bar 1 relative to the workpiece. This is facilitated by the bar 20 being longer than the bar 1, part of the bar 20 having been cut off in FIG. 5.

The embodiment shown in FIG. 5 can also be used to drill double rows of holes in workpieces, and the number of tabs 6 swivelled into line with the bar 1 can be adjusted to position the holes 2 and 22 where required relative to the workpiece. Further bars 1 and/or 21 can also be attached in order to produce further rows of holes in the workpiece.

The invention claimed is:

1. A drilling template for use in jointing workpieces, with each of said workpieces including an end portion, a face, and a side, the template comprising:
   a. a substantially rectilinear bar with through holes through which holes can be drilled in said workpieces to effect said jointing;
   b. a first bolt passing through said bar in a direction which is perpendicular to said through holes;
   c. a first plurality of stacked tabs, wherein
      i. each of said first plurality of stacked tabs is pivotally attached to said first bolt,
      ii. each of said first plurality of stacked tabs has a particular thickness,
      iii. each of said first plurality of stacked tabs pivots in a plane which is perpendicular to said first bolt,
      iv. each of said first plurality of stacked tabs is independently pivotable between a first position in which said stacked tab is parallel to said rectilinear bar and a second position in which said stacked tab is perpendicular to said rectilinear bar;
   d. a second bolt passing through said bar in a direction which is perpendicular to said through holes;
   e. a second plurality of stacked tabs, wherein
      i. each of said second plurality of stacked tabs is pivotally attached to said second bolt,
      ii. each of said second plurality of stacked tabs has a particular thickness,
      iii. each of said second plurality of stacked tabs pivots in a plane which is perpendicular to said second bolt,
      iv. each of said second plurality of stacked tabs is independently pivotable between a first position in which said stacked tab is parallel to said rectilinear bar and a second position in which said stacked tab is perpendicular to said rectilinear bar; and
   f. whereby said user can offset said through holes relative to said face of said workpiece by a varying amount by rotating a selected stacked tab in said first plurality of stacked tabs and a selected stacked tab in said second plurality of stacked tabs into said second position and placing said stacked tabs in said second position flat against said face of said workpiece while said rectilinear bar is mated to said end of said workpiece.

2. A template according to claim 1, wherein:
   a. said first bolt includes a first nut threadedly engaged thereto so that when said first nut is tightened said first nut locks said first plurality of stacked tabs in position; and
   b. said second bolt includes a second nut threadedly engaged thereto so that when said second nut is tightened said second nut locks said second plurality of stacked tabs in position.

3. A template according to claim 1 further comprising:
   a. a third bolt connected to said rectilinear bar, with said third bolt being perpendicular to said through holes, said first bolt, and said second bolt;
   b. a third bolt tab pivotally connected to said third bolt, wherein said third bolt tab is pivotable between a first position in which said third bolt tab is parallel to said through holes and a second position in which said third bolt tab is perpendicular to said through holes.

4. A template according to claim 1, wherein said spacers all have the same thickness to provide a uniform displacement of the bar relative to said face of said workpiece.

5. A drilling template according to claim 1, wherein said spacers have varying thicknesses to provide a varying displacement of the bar relative to said face of said workpiece.

6. A drilling template according to claim 1, further comprising a second substantially rectilinear bar, said second rectilinear bar being connected to said first rectilinear bar by said first and second bolts so that said second rectilinear bar is parallel to said first rectilinear bar, said second rectilinear bar including through holes which are parallel to said through holes in said first rectilinear bar.

7. A drilling template according to claim 6, wherein:
   a. said first bolt includes a first nut threadedly engaged thereto so that when said first nut is tightened said first nut locks said first plurality of stacked tabs in position; and
   b. said second bolt includes a second nut threadedly engaged thereto so that when said second nut is tightened said second nut locks said second plurality of stacked tabs in position.

8. A drilling template according to claim 6, further comprising:
   a. a third bolt connected to said first rectilinear bar, with said third bolt being perpendicular to said through holes, said first bolt, and said second bolt;
   b. a third bolt tab pivotally connected to said third bolt, wherein said third bolt tab is pivotable between a first position in which said third bolt tab is parallel to said through holes and a second position in which said third bolt tab is perpendicular to said through holes.

* * * * *